(12) United States Patent
Razdan

(10) Patent No.: US 9,955,452 B2
(45) Date of Patent: Apr. 24, 2018

(54) DYNAMICALLY ADJUSTING PAGING CYCLES OF A NETWORK AT AN ACCESS TERMINAL BASED ON SERVICE AVAILABILITY OF ANOTHER NETWORK WITHIN A WIRELESS COMMUNICATION SYSTEM

(75) Inventor: Ashu Razdan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1507 days.

(21) Appl. No.: 12/751,657

(22) Filed: Mar. 31, 2010

(65) Prior Publication Data

US 2010/0261487 A1   Oct. 14, 2010

Related U.S. Application Data

(60) Provisional application No. 61/168,487, filed on Apr. 10, 2009.

(51) Int. Cl.
| | |
|---|---|
| *H04W 36/00* | (2009.01) |
| *H04W 68/00* | (2009.01) |
| *H04B 7/00* | (2006.01) |
| *H04W 68/02* | (2009.01) |
| *H04W 52/02* | (2009.01) |
| *H04W 4/06* | (2009.01) |
| *H04W 68/12* | (2009.01) |

(Continued)

(52) U.S. Cl.
CPC ....... *H04W 68/02* (2013.01); *H04W 52/0216* (2013.01); *H04W 52/0245* (2013.01); *H04W 4/06* (2013.01); *H04W 68/00* (2013.01); *H04W 68/12* (2013.01); *H04W 76/04* (2013.01); *H04W 88/06* (2013.01); *Y02D 70/00* (2018.01); *Y02D 70/1222* (2018.01); *Y02D 70/1242* (2018.01)

(58) Field of Classification Search
CPC ...... H04W 36/30; H04W 68/00; H04W 88/06
USPC .......... 455/426, 436–444, 458, 515
See application file for complete search history.

(56) References Cited

U.S. PATENT DOCUMENTS 7,346,361 B2 *   3/2008   Kang et al. .............. 455/458
8,611,933 B2 *   12/2013  Chin et al. .............. 455/458
(Continued)

OTHER PUBLICATIONS

Wikipedia page on PPP.*
(Continued)

*Primary Examiner* — Joshua Schwartz
(74) *Attorney, Agent, or Firm* — Muncy, Geissler, Olds & Lowe

(57) ABSTRACT

In an embodiment, if service on both first and second networks is available, an access terminal negotiates with an access network to establish a paging cycle for the first network (e.g., 1x EV-DO) and a first dynamic paging cycle for the second network (e.g., CDMA2000 1x). If service on the second network is maintained but service on the first network becomes unavailable, the access network negotiates a second dynamic paging cycle (e.g., more aggressive or shorter than the first dynamic paging cycle) for the second network. If the access terminal determines that service on the second network is maintained and service is again available on the first network, the access terminal re-negotiates the first dynamic paging cycle for the second network. Accordingly, paging cycles on the second network are dynamically adjusted based on a service availability status of the first network.

54 Claims, 9 Drawing Sheets

(51) Int. Cl.
*H04W 76/04* (2009.01)
*H04W 88/06* (2009.01)

(56) References Cited

U.S. PATENT DOCUMENTS

| | | |
|---|---|---|
| 2003/0148785 A1 | 8/2003 | Mangal et al. |
| 2007/0160049 A1* | 7/2007 | Xie et al. .................... 370/390 |
| 2007/0197234 A1* | 8/2007 | Gill et al. .................... 455/458 |
| 2008/0117876 A1* | 5/2008 | Hidaka et al. ............... 370/331 |
| 2008/0261628 A1 | 10/2008 | Proctor et al. |
| 2010/0081454 A1* | 4/2010 | Wang et al. ............... 455/456.1 |
| 2010/0110963 A1* | 5/2010 | Huang et al. ................ 370/312 |
| 2011/0013559 A1* | 1/2011 | Marin .......................... 370/328 |

OTHER PUBLICATIONS

International Preliminary Report on Patentability—PCT/US2010/030582, The International Bureau of WIPO—Geneva, Switzerland, dated May 31, 2011.

Turner S et al: "cdma2000 Hybrid Access Terminal Operation" Announcement Qualcomm CDMA Technologies, Qualcomm, San Diego, CA, US, Apr. 9, 2001 (Apr. 9, 2001), pp. 1-25, XP002422171.

International Search Report, PCT/US2010/030582, International Searching Authority, European Patent Office, dated Jul. 2, 2010.

Written Opinion, PCT/US2010/030582, International Searching Authority, European Patent Office, dated Jul. 2, 2010.

\* cited by examiner

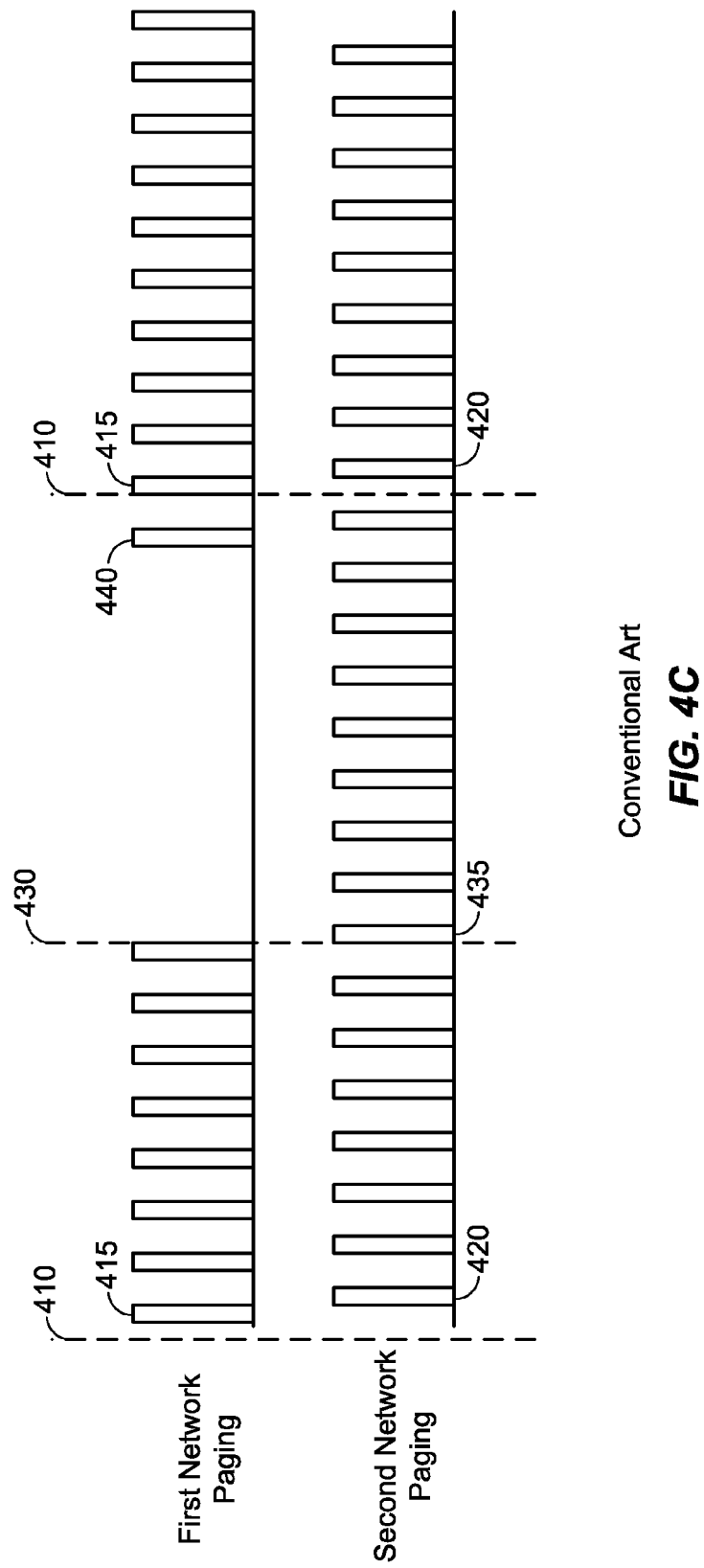

DYNAMICALLY ADJUSTING PAGING CYCLES OF A NETWORK AT AN ACCESS TERMINAL BASED ON SERVICE AVAILABILITY OF ANOTHER NETWORK WITHIN A WIRELESS COMMUNICATION SYSTEM

The present Application for Patent claims priority to Provisional Application No. 61/168,487, entitled "DYNAMICALLY ADJUSTING PAGING CYCLES OF A NETWORK AT AN ACCESS TERMINAL BASED ON SERVICE AVAILABILITY OF ANOTHER NETWORK WITHIN A WIRELESS COMMUNICATIONS SYSTEM", filed Apr. 10, 2009, assigned to the assignee hereof and hereby expressly incorporated by reference herein in its entirety.

BACKGROUND OF THE INVENTION

1. Field of the Invention

The invention relates to dynamically adjusting paging cycles of a network at an access terminal based on service availability of another network within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, if service on both first and second networks is available, an access terminal negotiates with an access network to establish a paging cycle for the first network (e.g., 1x EV-DO) and a first dynamic paging cycle for the second network (e.g., CDMA2000 1x). If service on the second network is maintained but service on the first network becomes unavailable, the access network negotiates a second dynamic paging cycle (e.g., more aggressive or shorter than the first dynamic paging cycle) for the second network. If the access terminal determines that service on the second network is maintained and service is again available on the first network, the access terminal re-negotiates the first dynamic paging cycle for the second network. Accordingly, paging cycles on the second network are dynamically adjusted based on a service availability status of the first network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 4C illustrates an example of paging cycles on the first and second networks for the given access terminal in accordance with the process of FIG. 4A if the second static paging cycle is set to be relatively short.

DETAILED DESCRIPTION

Figure 1:
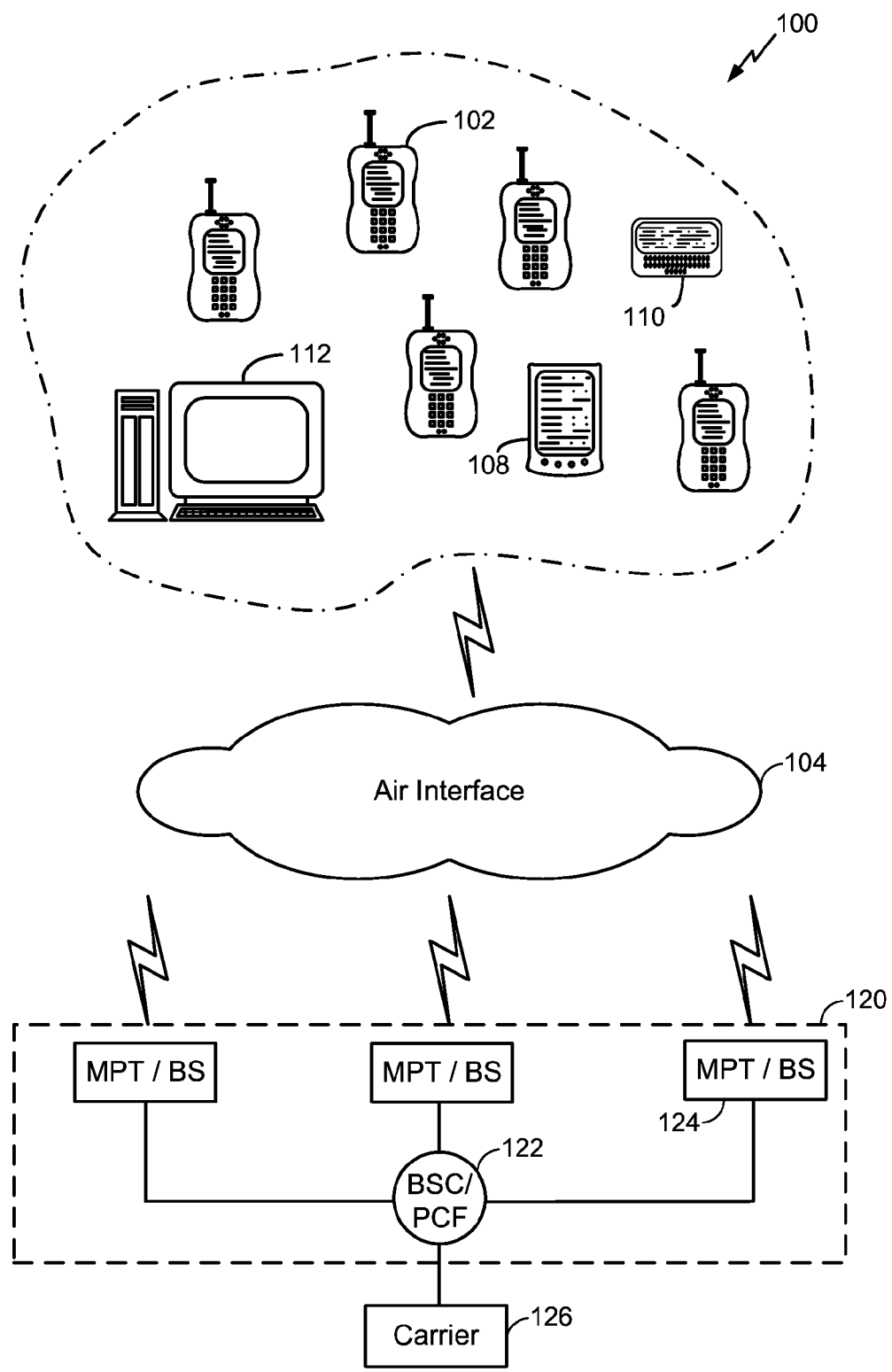
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
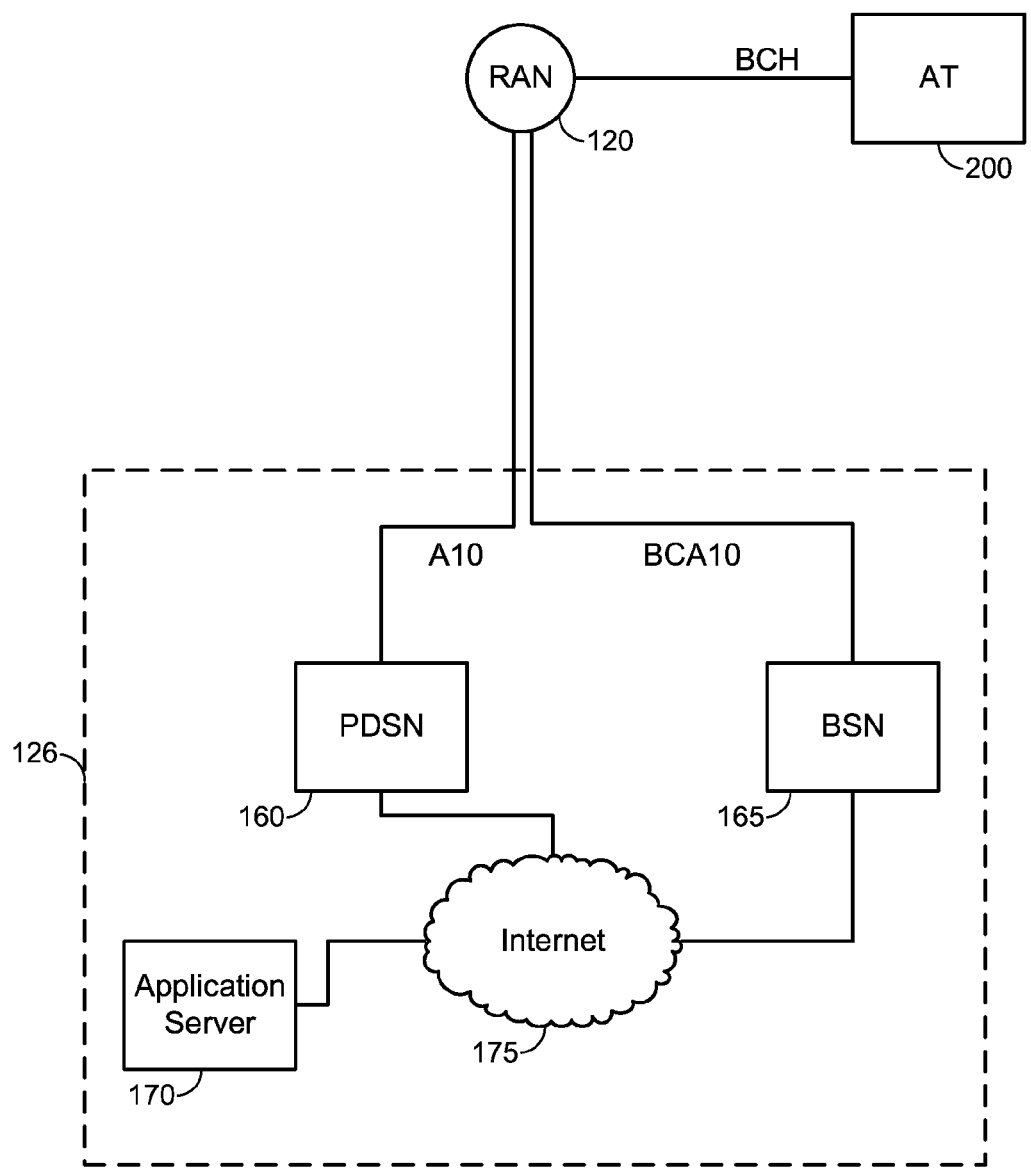
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
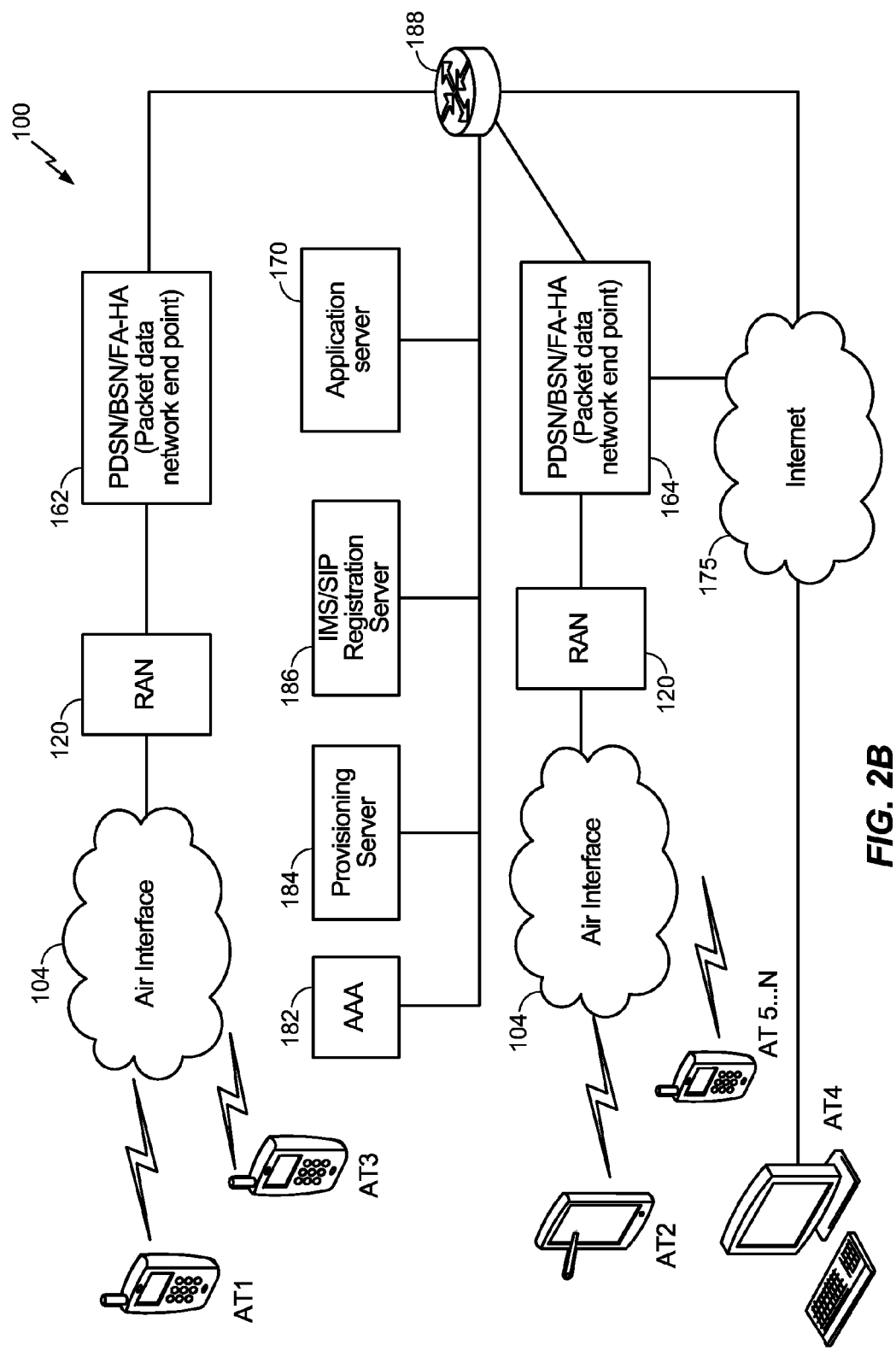
FIG. 2B illustrates an example of the wireless communication 100 of FIG. 1 in more detail.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Figure 3:
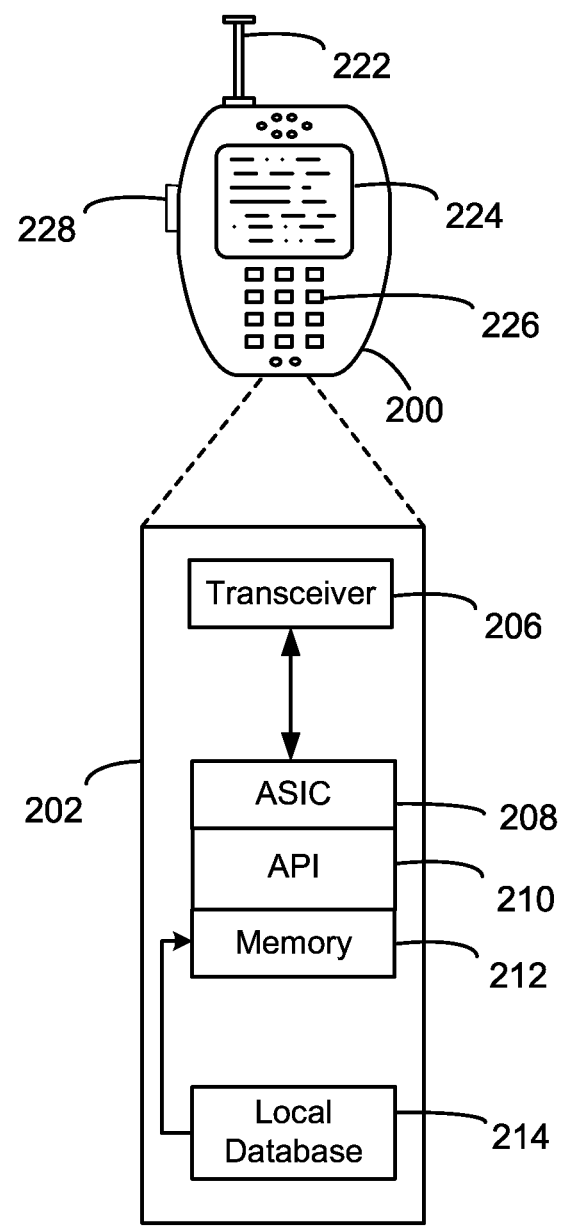
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

It is common for access terminals, such as AT 200, to monitor different types of wireless communication networks. For example, AT 200 can be configured to monitor data and/or other messaging from a first network such as 1x EV-DO, and can also be configured to monitor data and/or other messaging from a second network such as CDMA2000 1x. In an example, the antenna 222 of AT 200 can include multiple antennas, such as a primary antenna (e.g., having a higher sensitivity) and a secondary antenna (e.g., having a lower sensitivity), and can allocate the primary antenna substantially to the first network, and can allocate the secondary antenna substantially to the second network. Alternatively, the antenna 222 of AT 200 can include a single antenna, with the single antenna switching between the first and second networks as necessary (e.g., to monitor pages on each network when the AT is dormant, etc.).

In an example, the first network (e.g., 1x EV-DO) may be associated with higher data rates than the second network (e.g., CDMA2000 1x). Accordingly, when the first network is available, ATs may prefer to establish Point-to-Point Protocol (PPP) sessions with the first network rather than the second network. PPP is a data link protocol commonly used to establish a direct connection between two networking nodes. As used herein, establishing a PPP session over a given network means that a PPP connection has been established between the RAN 120 and the AT for that particular network, such that the RAN 120 can simply page the AT and then begin sending data without additional call set-up procedures. Establishing a PPP session does not necessarily mean that the AT is actually exchanging data with the RAN 120. For example, the AT can establish a PPP session over the first and/or the second network while still being in dormant mode. In dormant mode, the AT monitors the first and/or second networks for pages from the RAN 120, but does not actually have a traffic channel (TCH) that is continuously monitored and/or transmitted upon for data exchanges with the RAN 120.

Whenever an AT is dormant, or does not have an active TCH for a current communication session on any monitored network, the AT periodically wakes up and monitors a downlink control channel (CCH) or downlink paging channel (PCH) from the RAN 120 within each network being monitored by the AT. Assuming that the AT is not being paged by the RAN 120, the AT then goes back to sleep until waking up again to check whether the AT is being paged at a next paging cycle, or until a user of the AT requests that data be sent to the RAN 120. As will be appreciated by one of ordinary skill in the art, shorter paging cycles decrease call set-up time for the AT because the AT can potentially respond more quickly when the RAN 120 has data to send to the AT. However, shorter paging cycles also increase power consumption at the AT. Conventionally, paging cycles for networks where service is available are maintained irrespective of service availability of other networks, as will be described below with respect to FIG. 4A.

Figure 4A:
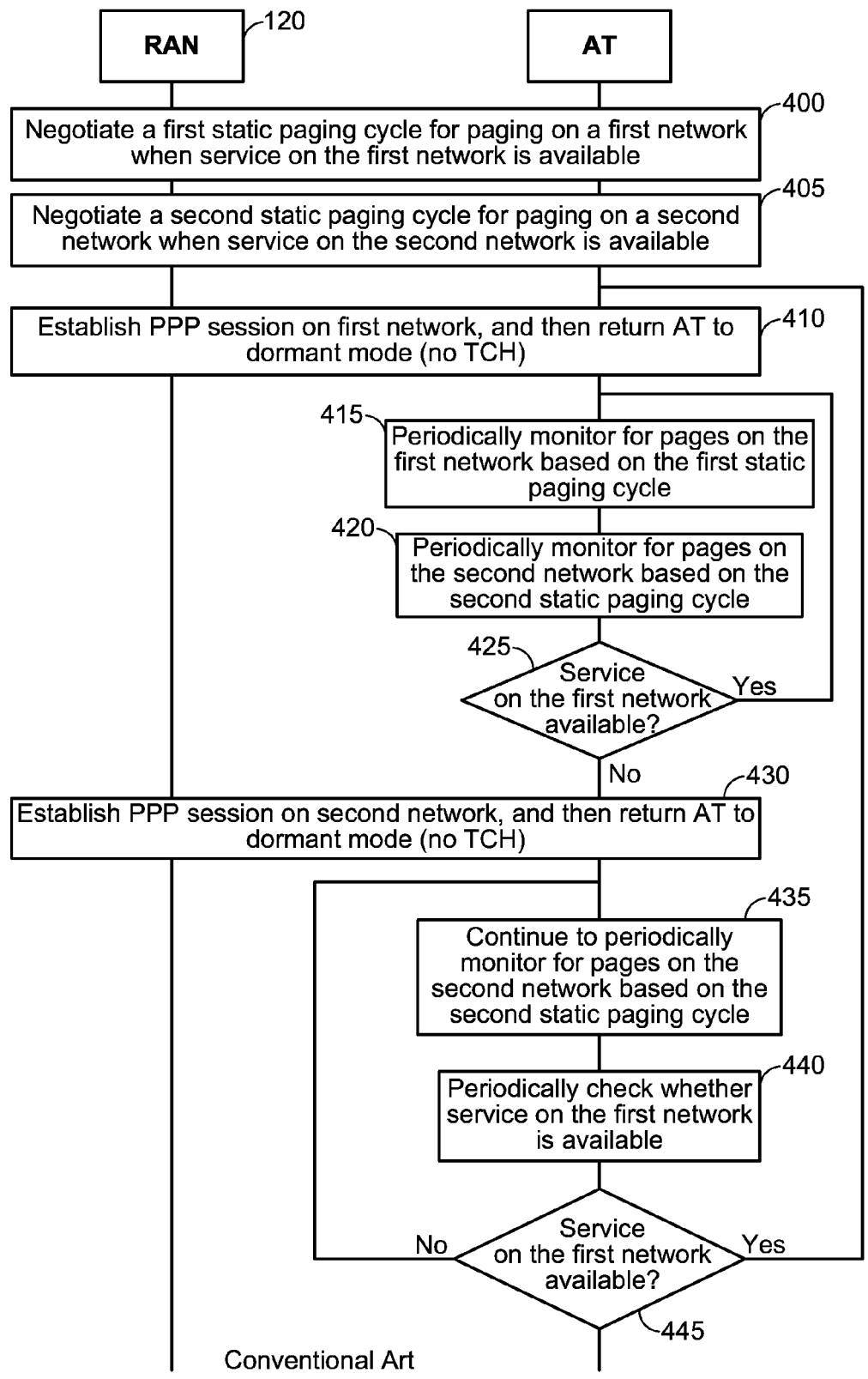
FIG. 4A illustrates a conventional process of monitoring a downlink channel for pages on each of a first network and a second network.

FIG. 4A illustrates a conventional process of monitoring a downlink channel for pages on each of a first network (e.g., 1x EV-DO) and a second network (e.g., CDMA2000 1x). Referring to FIG. 4A, a given AT negotiates with the RAN 120 in order to establish a first static paging cycle for page-monitoring on the first network when service on the first network is available, 400, and the given AT also negotiates with the RAN 120 to establish a second static paging cycle for page-monitoring on the second network when service on the second network is available, 405. For example, the given AT can request a desired paging cycle for the first and second networks in 400 and 405, respectively, and the RAN 120 can accept the requested paging cycles if the cycles are supportable by the RAN 120. The first and second paging cycles negotiated in 400 and 405 are 'static' in the sense that the paging cycles do not change during the process of FIG. 4A, so long as service from the associated network being monitored is available. While it is possible for the given AT to change the first and/or second static paging cycles by sending a configuration message at some later point in time to the RAN 120 in order to request a different paging cycle for the first or second network, this is relatively rare and such configuration messages are not typically triggered based on a performance metric of the other network.

In an example, the first static paging cycle can be set to a relatively aggressive paging cycle in 400 (e.g., 213 ms), such that the given AT will monitor for pages frequently in order to reduce call set-up times when the RAN 120 has data to send to the given AT. For example, if the RAN 120 is attempting to announce a communication session such as a push-to-talk (PTT) session, call latency is an important performance metric, and the call latency for PTT calls can be reduced by setting the first static paging cycle to a relatively aggressive level (i.e., a short duration or interval).

In a further example, it is somewhat less important for the second static paging cycle in 405 to be set as aggressively as the first static paging cycle. This is because, when possible, the RAN 120 and the given AT will attempt to exchange data over the first network due to the first network's superior data-transfer characteristics. However, the RAN 120 may still, from time to time, wish to send data to the given AT over the second network (e.g., for low-data-rate calls such as voice-calls, or when service on the first network is unavailable). Thus, the given AT cannot simply ignore the second network altogether. As will be appreciated by one of ordinary skill in the art, if the second static paging cycle is set to a relatively long period such that the given AT checks for pages less frequently (e.g., 3 seconds, 5 seconds, etc.), the given AT can conserve battery power. However, in the event that the RAN 120 pages the given AT on the second network, the associated call-setup latency or standby time is increased. Likewise, if the second static paging cycle is set to a more aggressive level (e.g., 1 second, etc.), call set-up latency is reduced while battery power consumption is increased.

In 410, the given AT establishes a PPP session on the first network. For example, establishing the PPP session can include bringing up a traffic channel (TCH) for a brief period of time. After the PPP session is established, the given AT returns to dormant mode and tears down the TCH. As discussed above, the given AT being in dormant mode means that after the PPP session is set-up for the given AT on the first network, the given AT is not allocated a TCH and is not yet engaged in an active communication session.

At this point, it may be assumed that the given AT has determined service to be available on both the first and second networks. Accordingly, the given AT periodically monitors for pages on the first network in accordance with the first static paging cycle, 415, and periodically monitors for pages on the second network in accordance with the second static paging cycle, 420. The given AT also periodically determines whether service on the first network remains available, 425 (e.g., by measuring the signal strength of a pilot signal on the first network and determining whether the signal strength of the pilot signal is above a threshold level, by measuring frame error rate (FER) of paging messages on a downlink paging cannel (PCH) or control channel (CCH), and/or based on some other network performance metric). While not shown in FIG. 4A, the given AT can also periodically determine whether service on the second network also remains available, but for convenience of explanation FIG. 4A has been described assuming that service on the second network remains available throughout the process.

In 425, if the given AT determines that service on the first network remains available, the process returns to 415. Otherwise, if the given AT determines that service on the first network is no longer available, the given AT establishes a PPP session on the second network (e.g., by briefly bringing up a TCH), and the given AT then returns to dormant mode (e.g., after the TCH is released or torn down), 430. As discussed above, the given AT being in dormant mode means that after the PPP session is set-up for the given AT on the second network, the given AT is not allocated a TCH and is not yet engaged in an active communication session.

In 435, the given AT continues to periodically monitor for pages on the second network in accordance with the second static paging cycle. The given AT also periodically checks whether service on the first network has become available again, 440 (e.g., by waking up and attempting to search for a pilot signal from the first network, or by tracking the FER of paging messages on the first network's downlink PCH or CCH, etc.). The periodic checking of 440 occurs much less frequently than pages were monitored for in accordance with the first static paging cycle. In an example, the first static paging cycle may be 213 ms, and the service-check interval in 440 may be 40 seconds or 80 seconds. If the given AT determines that service on the first network remains unavailable in 445, the process returns to 435. Otherwise, if the given AT determines that service on the first network is again available in 445, the process returns to 410.

Figure 4B:
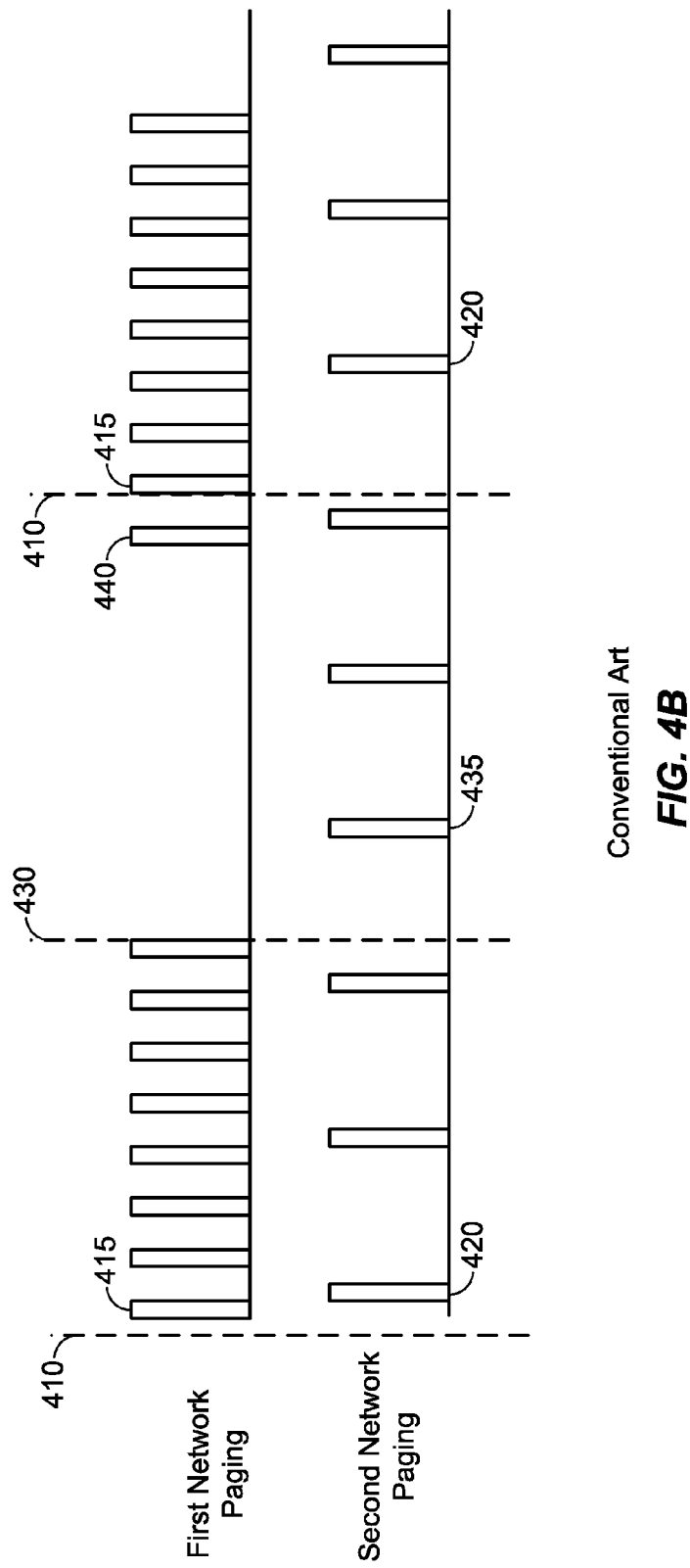
FIG. 4B illustrates an example of paging cycles on the first and second networks for a given access terminal in accordance with the process of FIG. 4A if the second static paging cycle is set to be relatively long.

FIG. 4B illustrates an example of paging cycles on the first and second networks for the given AT in accordance with the process of FIG. 4A if the second static paging cycle is set to be relatively long, and FIG. 4C illustrates an example of paging cycles on the first and second networks for the given AT in accordance with the process of FIG. 4A if the second static paging cycle is set to be relatively short. In FIGS. 4B and 4C, each paging cycle of the first and second networks is shown as having paging cycles that does not overlap with paging cycles of the other network because in a single-antenna scenario one antenna cannot monitor multiple networks at the same time. However, despite this illustration, it will be appreciated that a multi-antenna configuration can have one or more antennas monitor the first network while also having one or more antennas monitoring the second network. Thus, it is possible that the paging cycles illustrated in FIGS. 4B and/or 4C could overlap.

Referring to FIG. 4B, after the PPP session is established on the first network in 410, the first network is monitored in accordance with a relatively aggressive or short first static paging cycle, 415, and the second network is monitored in accordance with a less aggressive or longer paging cycle (i.e., the second static paging cycle), 420. In 430, after service on the first network is lost, the PPP session is established on the second network and the given AT continues monitoring the second network in accordance with the less aggressive or longer paging cycle (i.e., the second static paging cycle), 435, while the given AT infrequently determines whether service on the first network has been re-established, 440 (e.g., every 40 seconds, every 80 seconds, etc.). When service on the first network is determined to be re-established, the PPP session is again established on the first network in 415, the given AT resumes monitoring the first network in accordance with a relatively aggressive or short first static paging cycle (i.e., the first static paging cycle), 415, and the given AT continues monitoring the second network in accordance with less aggressive or longer paging cycle, 420. As will be appreciated from a review of FIG. 4B, the relatively long paging cycle for the second network means the given AT consumes a relatively low amount of battery power, but pages related to potentially time-sensitive data transfers received at 435 when the first network is unavailable may suffer from high call set-up latency.

Referring to FIG. 4C, after the PPP session is established on the first network in 410, the first network is monitored in accordance with a relatively aggressive or short first static paging cycle, 415, and the second network is also monitored in accordance with a relatively aggressive or shorter paging cycle (i.e., the second static paging cycle), 420. While the paging cycles on the first and second networks are illustrated as non-overlapping but having the same intervals, it will be appreciated that one or more of the paging cycles of the first and second networks can overlap, and also that the paging cycles of the first and second networks need not be exactly the same even where the second static paging cycle is set relatively aggressive.

Referring to FIG. 4C, in 430, after service on the first network is lost, the PPP session is established on the second network and the given AT continues monitoring the second network in accordance with the aggressive or shorter paging cycle, 435, while the given AT infrequently determines whether service on the first network has been re-established, 440. When service on the first network is determined to be re-established, the PPP session is again established on the first network in 415, the given AT resumes monitoring the first network in accordance with a relatively aggressive or short first static paging cycle, 415, and the given AT continues monitoring the second network in accordance with the aggressive or shorter paging cycle, 420 (i.e., the second static paging cycle). As will be appreciated from a review of FIG. 4C, the relatively short paging cycle for the second network means the given AT will have lower call set-up latency during 435, but will also consume more power during 420.

Accordingly, embodiments of the invention are directed to dynamically adjusting the paging cycle on the second network based on whether service is available on the first network. As will be described below in more detail with respect to FIGS. 5A and 5B, the paging cycle on the second network can be set to a relatively long period when service on the first network is available because the given AT can rely primarily on the first network for its data communication sessions, whereas the second network can be set to a relatively short or aggressive period when service on the first network is not available because the given AT cannot rely on the first network for its data communication sessions.

Figure 5A:
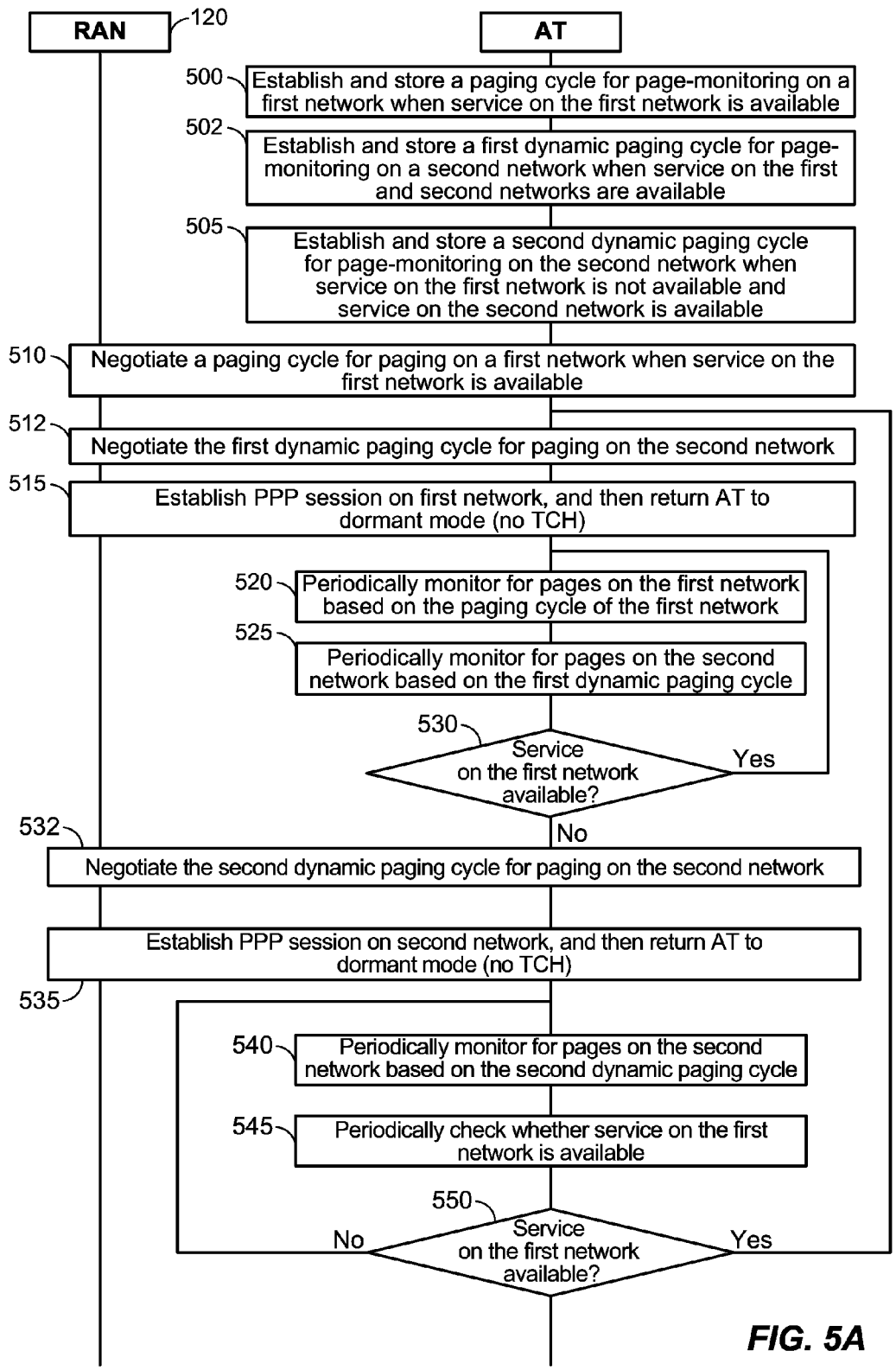
FIG. 5A illustrates a process of monitoring a downlink channel for pages on each of the first network and the second network in accordance with an embodiment of the invention.

FIG. 5A illustrates a process of monitoring a downlink channel for pages on each of a first network (e.g., 1x EV-DO) and a second network (e.g., CDMA2000 1x) in accordance with an embodiment of the invention. Referring to FIG. 5A, a given AT establishes and stores a paging cycle (e.g., 213 ms) for page-monitoring on the first network when service on the first network is available, 500. In an example, the paging cycle established in 500 for the first network may be static (e.g., may remain the same irrespective of whether service is available on the second network). In another example, the paging cycle established and stored in 500 may be specific to a particular application that is intended to run on the first network, such as a PTT application. The established paging cycle in 500 can be stored in non-volatile memory of the memory 212 of the given AT, such as in a provisionable field of the given AT's file system.

Referring to FIG. 5A, the given AT establishes and stores a first dynamic paging cycle (e.g., 5 seconds, 3 seconds, etc.) for page-monitoring on the second network when service on both the first and second networks is available, 502, and the given AT also establishes and stores a second dynamic paging cycle for page-monitoring on the second network when service on the first network is not available and service on the second network is available, 505. Similar to 500, the paging cycles established in 502 and 505 can be stored in non-volatile memory of the memory 212 of the given AT, such as in provisionable fields of the given AT's file system. Thus, instead of a single, static paging cycle for the second network that stays the same irrespective of the availability of service on the first network as in FIG. 4A, the process of FIG. 5A permits multiple paging cycles of the second network based on the status of the first network. In an example, the first dynamic paging cycle is set to a less aggressive setting or longer period (e.g., 3 seconds, 5 seconds, etc.) than the second dynamic paging cycle (e.g., 213 ms, 1.28 seconds, etc.), because the first dynamic paging cycle is used when the first network can be relied upon for data service.

In 510, the given AT negotiates with the RAN 120 in order to establish the paging cycle from 500 for page-monitoring on the first network, and the given AT also negotiates with the RAN 120 to establish the first dynamic paging cycle for page-monitoring on the second network, 512. For example, the given AT can request a desired paging cycle for the first and second networks in 510 and 512, respectively, and the RAN 120 can accept the requested paging cycles if the cycles are supportable by the RAN 120.

In 515, the given AT establishes a PPP session on the first network. For example, establishing the PPP session can include bringing up a traffic channel (TCH) for a brief period of time. After the PPP session is established, the given AT returns to dormant mode and tears down the TCH. As discussed above, the given AT being in dormant mode means that after the PPP session is set-up for the given AT on the first network, the given AT is not allocated a TCH and is not yet engaged in an active communication session.

At this point, it may be assumed that the given AT has determined service to be available on both the first and second networks. Accordingly, the given AT periodically monitors for pages on the first network in accordance with the first network's paging cycle, 520, and the given AT also periodically monitors for pages on the second network in accordance with the first dynamic paging cycle, 525. It will be appreciated that the first dynamic paging cycle is used for monitoring the second network in 525 because service is available on both the first and second networks at this point.

The given AT also periodically determines whether service on the first network remains available, 530 (e.g., by monitoring a pilot signal strength of the first network as measured at the given AT). As will be appreciated by one of ordinary skill in the art, if the given AT becomes engaged in an active data communication session on the second network (e.g., CDMA2000 1x), the given AT may not be able to monitor the first network (e.g., 1x EV-DO) to determine whether service is still available. Thus, blocks 525 and 530 are performed assuming that the given AT remains dormant at this point. While not shown in FIG. 5A, the given AT can also periodically determine whether service on the second network also remains available, but for convenience of explanation FIG. 5A has been described assuming that service on the second network remains available throughout the process.

Referring to FIG. 5A, in 530, if the given AT determines that service on the first network remains available, the process returns to 520. Otherwise, if the given AT determines that service on the first network is no longer available, the given AT loads the second dynamic paging cycle established in 505 from memory and negotiates the second dynamic paging cycle with the RAN 120 (e.g., by sending a configuration message to the RAN 120 to request the new paging cycle, and receiving an acceptance of the requested paging cycle change), 532. The given AT also establishes a PPP session on the second network (e.g., by temporarily bringing up a TCH), and the given AT then returns to dormant mode, 535. As discussed above, the given AT being in dormant mode means that after the PPP session is set-up for the given AT on the second network, the given AT is not allocated a TCH and is not yet engaged in an active communication session.

In 540, the given AT periodically monitors for pages on the second network in accordance with the second dynamic paging cycle as negotiated in 532. It will be appreciated that the second dynamic paging cycle is used for monitoring the second network in 540 because service is available on the second network but is not available on the first network at this point. The given AT also periodically checks whether service on the first network has become available again, 545 (e.g., by searching for a pilot signal from the first network). As noted, the periodic check of 545 can occur unless the given AT is engaged in an active data communication session on the second network, in which case the given AT may not necessarily have the resources to track the availability of the first network. Thus, assuming the given AT remains dormant, the periodic checking of 545 occurs much less frequently than pages were monitored for in accordance with the first network's paging cycle in 520. In an example, the first network's paging cycle in 520 may be 213 ms, and the service-check interval in 545 may be 40 seconds or 80 seconds. If the given AT determines that service on the first network remains unavailable in 550, the process returns to 540. Otherwise, if the given AT determines that service on the first network is again available in 550, the process returns to 512 and the given AT re-negotiates the first dynamic paging cycle for the second network with the RAN 120.

Figure 5B:
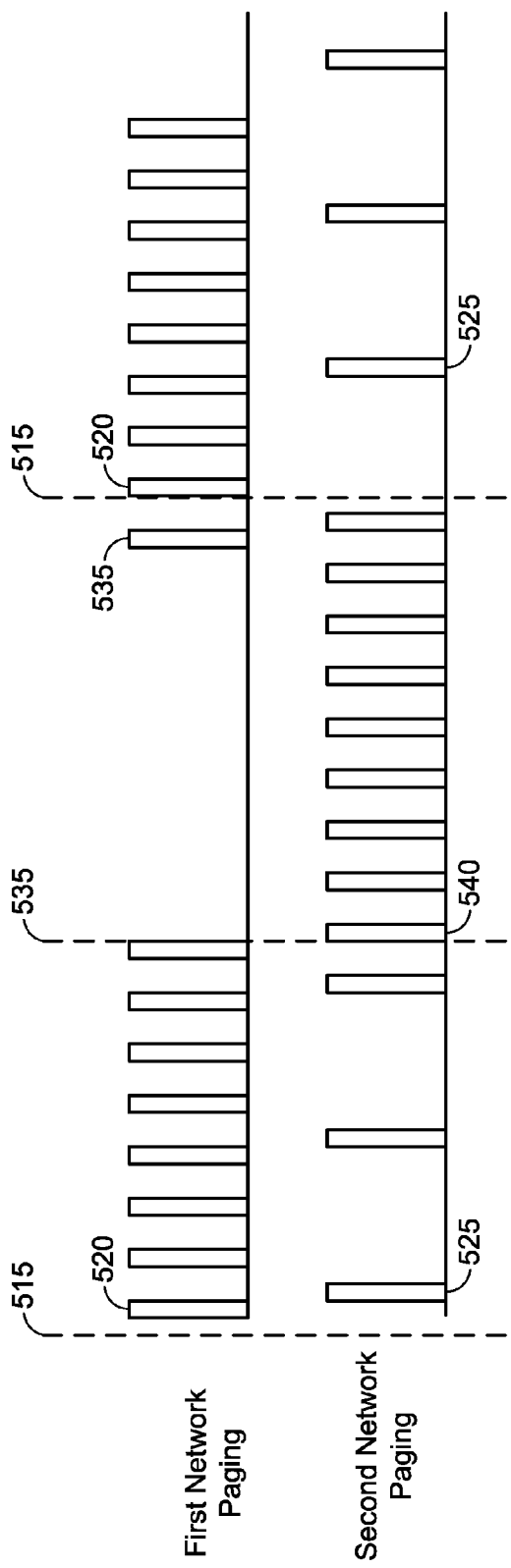
FIG. 5B illustrates an example of paging cycles on the first and second networks for the given access terminal in accordance with the process of FIG. 5A in accordance with an embodiment of the invention.

FIG. 5B illustrates an example of paging cycles on the first and second networks for the given AT in accordance with the process of FIG. 5A wherein the paging cycle of the first network and the second dynamic paging cycle of the second network are set to relatively short paging cycles or paging cycle intervals, and the first dynamic paging cycle of the second network is set to a relatively long paging cycle or paging cycle interval. In FIG. 5B, each paging cycle of the first and second networks is shown as having paging cycles that do not overlap with paging cycles of the other network because in a single-antenna scenario one antenna cannot monitor multiple networks at the same time. However, despite this illustration, it will be appreciated that a multi-antenna configuration can have one or more antennas monitor the first network while also having one or more antennas monitoring the second network. Thus, it is possible that the paging cycles illustrates in FIG. 5B could overlap in other embodiments of the invention.

Referring to FIG. 5B, after the PPP session is established on the first network in 515, the first network is monitored in accordance with a relatively aggressive or short paging cycle, 520, and the second network is monitored in accordance with the first dynamic paging cycle (e.g., a less aggressive or longer paging cycle), 525. In 535, after service on the first network is lost, the PPP session is established on the second network and the given AT transitions to the more-aggressive second dynamic paging cycle, 540, while the given AT infrequently determines whether service on the first network has been re-established (if possible), 545 (e.g., every 40 seconds, every 80 seconds, etc.). When service on the first network is determined to be re-established, the PPP session is again established on the first network in 515, the given AT resumes monitoring the first network in accordance with a relatively aggressive paging cycle of the first network, 520, and the given AT transitions from the second dynamic paging cycle back to the first dynamic paging cycle and thereby resumes monitoring the second network in accordance with a less aggressive or longer paging cycle, 525. Accordingly, battery power consumption associated with monitoring for potential pages on the second network are reduced when the first network is available for service by increasing or lengthening the paging cycle of the second network, whereas call set-up latency is reduced when the first network is not available by decreasing or shortening the paging cycle of the second network.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of determining whether a given access terminal is being paged within a wireless communications system, comprising:
   periodically monitoring, while a first network has a first service availability state, a second network in accordance with a first paging cycle of a plurality of paging cycles;
   determining that the first service availability state of the first network has changed to a second service availability state;
   selecting a second paging cycle of the plurality of paging cycles for page monitoring on the second network based on the determination that the first service availability state of the first network has changed to the second service availability state, the second paging cycle having a different frequency than the first paging cycle; and
   periodically monitoring the second network for pages in accordance with the second paging cycle.

2. The method of claim 1,
   wherein the first paging cycle is configured to be selected by the selecting when service on both the first network and the second network is determined to be available, and
   wherein the second paging cycle is configured to be selected by the selecting when service on the first network is unavailable and service on the second network is determined to be available.

3. The method of claim 2, wherein the first paging cycle is longer than the second paging cycle.

4. The method of claim 1, further comprising:
   periodically monitoring the first network for pages in accordance with another paging cycle.

5. The method of claim 4, wherein the another paging cycle for page monitoring on the first network does not change based on service-availability of the second network.

6. The method of claim 5, wherein the another paging cycle for page monitoring on the first network remains the same so long as the given access terminal is in a dormant mode and service on the first network remains available.

7. The method of claim 1, wherein the determining determines that service is available on the first network and further determines that service is also available on the second network.

8. The method of claim 7, further comprising:
   responsive to the determination that service is available on the first network and that service is also available on the second network, establishing a point-to-point protocol (PPP) session on the first network.

9. The method of claim 7, further comprising:
   periodically monitoring the first network for pages in accordance with another paging cycle,
   wherein the periodically monitoring the first network uses a shorter paging cycle than the selected paging cycle used by the periodically monitoring the second network.

10. The method of claim 7, further comprising:
    determining that service is no longer available on the first network and that service remains available on the second network.

11. The method of claim 10, further comprising:
    responsive to the determination that service is no longer available on the first network and that service remains available on the second network, establishing a point-to-point protocol (PPP) session on the second network.

12. The method of claim 10, further comprising:
    selecting and negotiating a different one of the plurality of paging cycles for page monitoring on the second network based on the determination that service is no longer available on the first network and that service remains available on the second network; and
    periodically monitoring the second network for pages in accordance with the selected different paging cycle.

13. The method of claim 12, wherein the selected paging cycle is longer than the selected different paging cycle.

14. The method of claim 1, wherein the determining determines that service is unavailable on the first network and further determines that service is available on the second network.

15. The method of claim 14, further comprising:
responsive to the determination that service is unavailable on the first network and that service is available on the second network, establishing a point-to-point protocol (PPP) session on the second network.

16. The method of claim 14, further comprising:
determining that service has become available on the first network and that service remains available on the second network.

17. The method of claim 16, further comprising:
selecting and negotiating a different one of the plurality of paging cycles for page monitoring on the second network based on the determination that service has become available on the first network and that service remains available on the second network; and
periodically monitoring the second network for pages in accordance with the selected different paging cycle.

18. The method of claim 17, wherein the selected paging cycle is shorter than the selected different paging cycle.

19. The method of claim 17, further comprising:
responsive to the determination that service has become available on the first network and that service remains available on the second network, establishing a point-to-point protocol (PPP) session on the first network.

20. The method of claim 19, further comprising:
responsive to the determination that service has become available on the first network and that service remains available on the second network, periodically monitoring the first network for pages in accordance with another paging cycle,
wherein the periodically monitoring the first network uses a shorter paging cycle than the selected different paging cycle.

21. An apparatus for determining whether a given access terminal is being paged within a wireless communications system, comprising:
means for periodically monitoring, while a first network has a first service availability state, a second network in accordance with a first paging cycle of a plurality of paging cycles;
means for determining that the first service availability state of the first network has changed to a second service availability state;
means for selecting a second paging cycle of the plurality of paging cycles for page monitoring on the second network based on the determination that the first service availability state of the first network has changed to the second service availability state, the second paging cycle having a different frequency than the first paging cycle; and
means for periodically monitoring the second network for pages in accordance with the second paging cycle.

22. The apparatus of claim 21,
wherein the first paging cycle is configured to be selected by the means for selecting when service on both the first network and the second network is determined to be available, and
wherein the second paging cycle is configured to be selected by the means for selecting when service on the first network is unavailable and service on the second network is determined to be available.

23. The apparatus of claim 22, wherein the first paging cycle is longer than the second paging cycle.

24. The apparatus of claim 21, further comprising:
means for periodically monitoring the first network for pages in accordance with another paging cycle.

25. The apparatus of claim 21, wherein the means for determining determines that service is available on the first network and further determines that service is also available on the second network.

26. The apparatus of claim 25, further comprising:
means for establishing a point-to-point protocol (PPP) session on the first network, wherein the means for establishing is responsive to the determination that service is available on the first network and that service is also available on the second network.

27. The apparatus of claim 25, further comprising:
means for periodically monitoring the first network for pages in accordance with another paging cycle, wherein the means for periodically monitoring the first network uses a shorter paging cycle than the selected paging cycle used by the means for periodically monitoring the second network.

28. The apparatus of claim 25, further comprising:
means for determining that service is no longer available on the first network and that service remains available on the second network.

29. The apparatus of claim 28, further comprising:
means for establishing a point-to-point protocol (PPP) session on the second network, wherein the means for establishing is responsive to the determination that service is no longer available on the first network and that service remains available on the second network.

30. The apparatus of claim 29, further comprising:
means for selecting and negotiating a different one of the plurality of paging cycles for page monitoring on the second network based on the determination that service is no longer available on the first network and that service remains available on the second network; and
means for periodically monitoring the second network for pages in accordance with the selected different paging cycle.

31. An apparatus configured to determine whether a given access terminal is being paged within a wireless communications system, comprising:
one or more circuits and/or processors configured to periodically monitor, while a first network has a first service availability state, a second network in accordance with a first paging cycle of a plurality of paging cycles;
one or more circuits and/or processors configured to determine that the first service availability state of the first network has changed to a second service availability state;
one or more circuits and/or processors configured to select a second paging cycle of the plurality of paging cycles for page monitoring on the second network based on the determination that the first service availability state of the first network has changed to the second service availability state, the second paging cycle having a different frequency than the first paging cycle; and
one or more circuits and/or processors configured to periodically monitor the second network for pages in accordance with the second paging cycle.

32. The apparatus of claim 31,
wherein the first paging cycle is configured to be selected by the one or more circuits and/or processors configured to select when service on both the first network and the second network is determined to be available, and
wherein the second paging cycle is configured to be selected by the one or more circuits and/or processors configured to select when service on the first network is unavailable and service on the second network is determined to be available.

33. The apparatus of claim 32, wherein the first paging cycle is longer than the second paging cycle.

34. The apparatus of claim 31, further comprising:
one or more circuits and/or processors configured to periodically monitor the first network for pages in accordance with another paging cycle.

35. The apparatus of claim 31, wherein the one or more circuits and/or processors configured to determine determines that service is available on the first network and further determines that service is also available on the second network.

36. The apparatus of claim 35, further comprising:
one or more circuits and/or processors configured to establish a point-to-point protocol (PPP) session on the first network, wherein the one or more circuits and/or processors configured to establish is responsive to the determination that service is available on the first network and that service is also available on the second network.

37. The apparatus of claim 35, further comprising:
one or more circuits and/or processors configured to periodically monitor the first network for pages in accordance with another paging cycle, wherein the one or more circuits and/or processors configured to periodically monitor the first network uses a shorter paging cycle than the selected paging cycle used by one or more circuits and/or processors configured to periodically monitor the second network.

38. The apparatus of claim 35, further comprising:
one or more circuits and/or processors configured to determine that service is no longer available on the first network and that service remains available on the second network.

39. The apparatus of claim 38, further comprising:
one or more circuits and/or processors configured to establish a point-to-point protocol (PPP) session on the second network, wherein the one or more circuits and/or processors configured to establish is responsive to the determination that service is no longer available on the first network and that service remains available on the second network.

40. The apparatus of claim 39, further comprising:
one or more circuits and/or processors configured to select and negotiate a different one of the plurality of paging cycles for page monitoring on the second network based on the determination that service is no longer available on the first network and that service remains available on the second network; and
one or more circuits and/or processors configured to periodically monitor the second network for pages in accordance with the selected different paging cycle.

41. A non-transitory computer-readable storage medium comprising instructions, which, when executed by at least one processor cause the at least one processor to determine whether a given access terminal is being paged within a wireless communications system, the instructions comprising:
instructions to periodically monitor, while a first network has a first service availability state, a second network in accordance with a first paging cycle of a plurality of paging cycles;
instructions to determine that the first service availability state of the first network has changed to a second service availability state;
instructions to select a second paging cycle of the plurality of paging cycles for page monitoring on the second network based on the determination that the first service availability state of the first network has changed to the second service availability state, the second paging cycle having a different frequency than the first paging cycle; and
instructions to periodically monitor the second network for pages in accordance with the second paging cycle.

42. The non-transitory computer-readable storage medium of claim 41,
wherein the first paging cycle is configured to be selected by the instructions to select when service on both the first network and the second network is determined to be available, and
wherein the second paging cycle is configured to be selected by the instructions to select when service on the first network is unavailable and service on the second network is determined to be available.

43. The non-transitory computer-readable storage medium of claim 42, wherein the first paging cycle is longer than the second paging cycle.

44. The non-transitory computer-readable storage medium of claim 41, further comprising:
instructions to periodically monitor the first network for pages in accordance with another paging cycle.

45. The non-transitory computer-readable storage medium of claim 41, wherein the instructions to determine determines that service is available on the first network and further determines that service is also available on the second network.

46. The non-transitory computer-readable storage medium of claim 45, further comprising:
instructions to establish a point-to-point protocol (PPP) session on the first network, wherein the instructions to establish is responsive to the determination that service is available on the first network and that service is also available on the second network.

47. The non-transitory computer-readable storage medium of claim 45, further comprising:
instructions to periodically monitor the first network for pages in accordance with another paging cycle, wherein the instructions to periodically monitor the first network uses a shorter paging cycle than the selected paging cycle used by instructions to periodically monitor the second network.

48. The non-transitory computer-readable storage medium of claim 45, further comprising:
instructions to determine that service is no longer available on the first network and that service remains available on the second network.

49. The non-transitory computer-readable storage medium of claim 48, further comprising:
instructions to establish a point-to-point protocol (PPP) session on the second network, wherein the instructions to establish is responsive to the determination that service is no longer available on the first network and that service remains available on the second network.

50. The non-transitory computer-readable storage medium of claim 49, further comprising:
instructions to select and negotiate a different one of the plurality of paging cycles for page monitoring on the second network based on the determination that service is no longer available on the first network and that service remains available on the second network; and instructions to periodically monitor the second network for pages in accordance with the selected different paging cycle.

51. The method of claim 1, wherein the first network has a first network type and the second network has a second network type that is different than the first network type.

52. The method of claim 51, wherein the first network type is associated with higher date rates as compared to the second network type.

53. The method of claim 52, wherein the first network type is 1x EV-DO and the second network type is CDMA2000 1x.

54. The method of claim 1, wherein each of the plurality of paging cycles is a candidate for page monitoring on the second network.

* * * * *